July 5, 1949.  E. M. WINEGAR  2,475,267
MECHANISM FOR MOLDING RUBBER AND LIKE ARTICLES
Filed Nov. 28, 1945  2 Sheets-Sheet 1
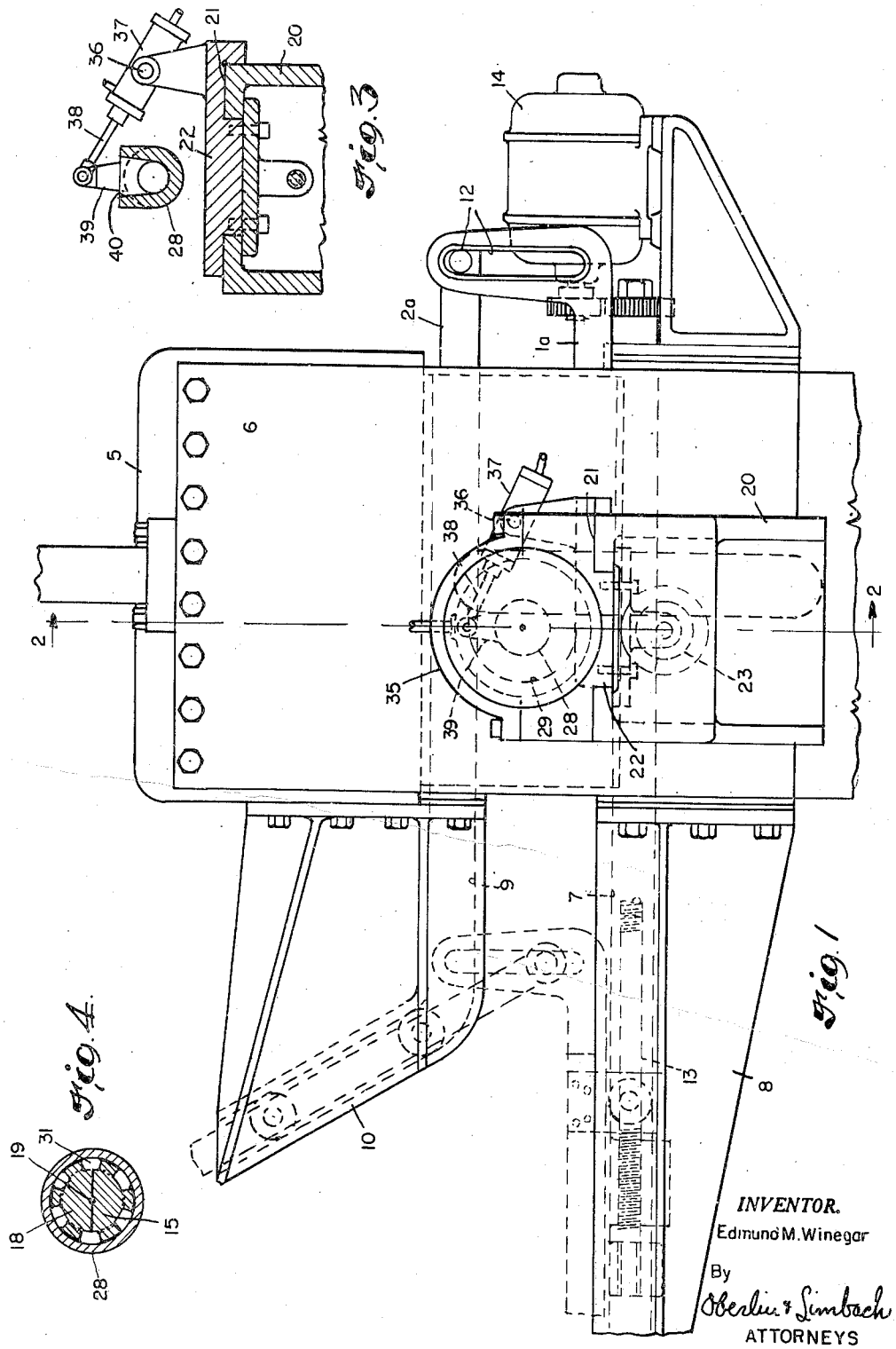
INVENTOR.
Edmund M. Winegar
By
Oberlin & Limbach
ATTORNEYS July 5, 1949.                        E. M. WINEGAR                        2,475,267
                    MECHANISM FOR MOLDING RUBBER AND LIKE ARTICLES
Filed Nov. 28, 1945                                                  2 Sheets-Sheet 2
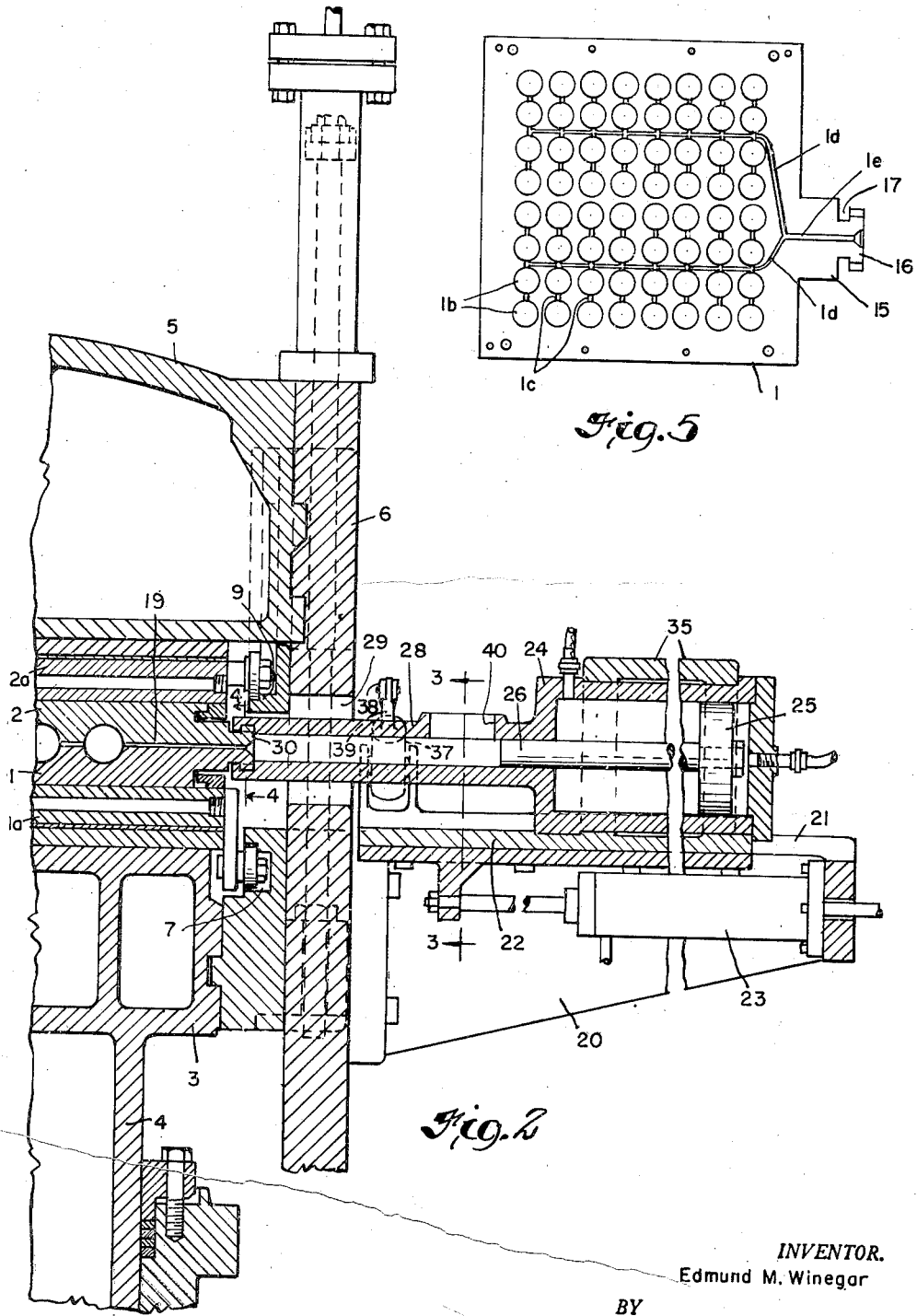
INVENTOR.
Edmund M. Winegar
BY
Oberlin & Limbach
ATTORNEYS Patented July 5, 1949

2,475,267

UNITED STATES PATENT OFFICE 2,475,267

MECHANISM FOR MOLDING RUBBER AND LIKE ARTICLES

Edmund M. Winegar, Willoughby, Ohio, assignor to The Ohio Rubber Company, Willoughby, Ohio, a corporation of Ohio Application November 28, 1945, Serial No. 631,247

7 Claims. (Cl. 18—30)

The present improvements, relating as indicated to the molding of rubber and like articles, have more particular regard to the automatic charging of the molds in a vulcanizing press with plastic moldable material such as a vulcanizable rubber compound.

Particularly in the case of multiple cavity molds, the time and delay involved in charging the cavities with the requisite measured amounts of the plastic moldable material constitutes a serious problem even where the press wherein the mold parts are held during the vulcanizing operation is more or less automatic in character, as for example in the press which forms the subject matter of U. S. Patent No. 2,171,511 to E. M. Winegar and F. L. Dawes, dated August 29, 1939. As illustrated in the case of the patent just cited, the molds wherein the articles are formed and vulcanized usually comprise two complementary parts, each with a series of cavities matching corresponding cavities in the other, and in the operation of such press the requisite amounts of plastic material require to be separately placed in the cavities in one such mold part, before the mold parts can be closed, placed in the press and there subjected to the necessary vulcanizing temperature.

One principal object of the present invention is to provide means whereby such charging of the mold cavity or cavities in a separable mold may be accomplished in the closed condition of the latter. A further object is to provide automatic means for thus charging the mold, the operation of which may be synchronized with the other movements of the press, including the removal from and return of the mold thereto, it being understood of course that after the vulcanization is complete the mold is removed from the press and opened to permit the removal therefrom of the molded articles.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a broken side elevation of a vulcanizing press designed to work with separable, plural-cavity molds of the character described;

Fig. 2 is a transverse vertical sectional view thereof taken on the plane indicated by the line 2—2, Fig. 1;

Fig. 3 is a transverse sectional view of a portion of the mold charging mechanism taken on a plane at right angles to that of Fig. 2, as indicated by line 3—3 thereon;

Fig. 4 is a similar transverse section of another portion of such mechanism taken on the plane indicated by the line 4—4, Fig. 2; and Fig. 5 is a plan view of one of the plural-cavity mold parts.

In addition to being designed to work with separable, plural-cavity molds, the press illustrated in the several figures of the drawing is generally of the construction set forth in the above-identified patent, except that, unlike the latter, for the sake of simplicity said press is shown as being arranged and adapted to handle a single pair of complementary mold parts instead of two such pairs. Thus in Figs. 1 and 2 the mold parts 1 and 2, shown in their closed position, are further shown as held between the head or ram 3 of a vertically operating fluid pressure-actuated piston 4 and the upper press head 5. Associated with such mold parts are hollow platens 1a and 2a to which they are fixedly attached, such platens being provided with suitable connections (not shown), whereby, when the mold parts in question are in their closed position, steam or other heating medium may be circulated through said platens and thus raise the mold parts and the material contained therein to vulcanizing temperature. Since the construction of the frame 6 and of the actuating means for piston 4 form no part of the present invention, it is unnecessary to describe the same further than to indicate that upon raising head or ram 3 the platens with attached mold parts will be firmly pressed together and steam or other heating medium be circulated through such platens.

Following the construction of the press of such patent, the lower head 4 of the present press is also shown as being provided with a pair of parallel runways 7 that extend laterally of said head, being carried by suitable brackets 8, and the platen which carries the lower mold part 2 is supported on such runways by means of rollers whereby it may be moved into and out of position between the press heads. There is also provided another parallel pair of runways 9 which likewise extend laterally of the press, being carried on brackets 10, and the other platen which carries the upper mold part 1 is provided with rollers which are adapted to run on said last-mentioned trackways. The lower pair of trackways 7 are horizontal throughout their entire extent. However, the portions of the upper pair 9 which are carried by brackets 10 turn upwardly at an angle, as shown at the right in Fig. 1. As also shown in Fig. 1, the two platens are pivotally connected together at their one side by means of a sliding pivotal connection 12. As a result of the foregoing construction, when the platens with the mold parts are moved from between the press heads outwardly along the trackways 7 and 9, the upper platen is swung upwardly away from the lower platen, thus separating the mold parts and exposing their contacting faces with the cavities therein. Movement of the platens with the mold parts thus carried thereby from their position between the press heads to such outer open position may be effected by any suitable means, e. g. by a horizontally extending screw 13 that is connected with the lower of said platens and is adapted to be reversibly driven by means of a motor 14.

Heretofore in a press constructed as above described, it has been necessary to charge the cavities in the mold parts with the material to be vulcanized while the parts are separated, as shown in dotted outline at the left in Fig. 1, and where such parts contain a considerable number of cavities 1b as found in the illustration of part 1, Fig. 5, the filling of these individually with properly measured amounts of such material is tedious and time-consuming. The improvements which constitute the present invention and which will now be described comprise means whereby such filling operation may be accomplished more or less automatically with the mold parts in their closed position, in contradistinction to thus filling the same when open.

To this end, the construction of said mold parts as illustrated in the case of part 1 in the figure just referred to is modified by connecting the several cavities formed therein by means of grooves or channels 1c which are in turn connected with larger channels 1d branching from a main channel 1e which enters the mold part from one side thereof. It will be understood that the complementary mold part 2 has the cavities therein connected with similar matching channels so that when the two parts are brought together the completed cavities wherein the articles are to be molded will all be connected through a system of branching passages which communicate with a passage entering the closed mold parts from the one side thereof. The passages thus formed will desirably gradually decrease in size so as to permit the free and even flow of material supplied through such main passage to all of the mold cavities. While only one main channel 1e leading from one side of the mold parts is shown in Fig. 5, it will be obvious that a similar channel may be provided on the opposite side and connected by suitable branches with all or part of the cavities 1c. In other words, provision may be made for supplying material to the closed mold parts from either or both sides thereof through main passages formed by matching main channels 1e, each of which may be connected with all of the cavities or the one with certain thereof and the other with the remaining cavities.

The mold part 1 on the side where such main channel 1e is provided is formed with a semi-cylindrical projection 15 that includes a peripherally notched extension 16 separated therefrom by a semi-circular recess 17 and mold member 2 is formed with a similar projection 18, so that when the mold parts are closed a cylindrical projection of the cross-sectional form shown in Fig. 4 will extend laterally therefrom with a central passage 19 formed by the two complementary channels therein. In order to clear certain parts of the press frame structure the projections thus provided on the mold parts are shown as displaced to one side of their transverse median line. However, should it be found possible in other types of press construction, such projections, and thus the main passageway for charging the cavities within the mold, would desirably be located on the median line of the latter.

Extending laterally from the side of the press adjacent the position occupied by the projections thus provided on the mold parts when the latter are in their closed position between the press heads is a bracket 20, such bracket being formed on its upper face with a slideway 21 aligned with the common axis of such projections, i. e. with the charging passage provided in the latter. Reciprocably mounted on such slideway is a slide 22 which is adapted to be moved in and out, i. e. toward and from the press frame, by means of a piston (not shown) operating in a hydraulic cylinder 23, and on such slide is in turn mounted a second hydraulic cylinder 24 having a piston 25 that carries a stem or plunger 26. The outer end end of the latter is fitted into a tubular extension 28 that projects from the inwardly directed end of cylinder 24 in axial alignment with the cylindrical projection presented by the closed mold parts, as just described, the press frame being formed with an opening 29 so as to permit the end of such tubular extension to be brought into engagement with such projection. Such end of extension 28 (see Figs. 2 and 4) is formed with an internal annular recess 30 that corresponds in diameter with that of the semi-circular extensions 16 on the mold parts and the portion beyond such recess is formed to provide notches complementary to those on such extensions.

As a result of the construction just described it will be seen that upon moving cylinder 24 with the extension 28 in properly indexed relation to the projections 15 on the mold parts the end of such extension will overlap the extensions 16 on such projections, and upon then imparting a slight rotative movement to the cylinder and its extension the parts in question will be securely locked together.

In order to permit such indexing and rotation of the cylinder and its extension, the cylinder is mounted on slide 22 in a suitable bearing 35 which serves at the same time to hold the same against endwise movement relatively to said slide. Also mounted on trunnion bearings 36 on said slide is a small transversely disposed hydraulic cylinder 37, the piston of which has its rod 38 connected with an arm 39 that projects radially from cylinder extension 28. As a result it will be seen that by supplying pressure fluid to one end or the other of said cylinder 37 the cylinder 24 with its extension may be rotated so as to couple the inner end of such extension to the projections on the closed mold parts, or uncouple the same, as desired. It will also be seen that when the extension is thus uncoupled, by longitudinally reciprocating slide 22 the inner end of said extension 28 may be moved outwardly so as to lie entirely clear of the projections on the mold parts and thus leave the latter free to be moved out from between the press heads.

As best shown in Fig. 2, tubular extension 28 of cylinder 24 is provided in its upper wall with a suitable opening 40 through which a suitably prepared body of the plastic material which is to be molded may be introduced into the bore of said extension, in advance of plunger 26 when the latter is in its retracted position, as shown in said figure. Thereupon by supplying pressure fluid to the outer end of the cylinder the plunger will be moved so as to force such material under any desired degree of pressure towards the inner end of said extension. Accordingly, assuming such inner end to be coupled in the manner previously described to the projections of the closed mold parts, the material will be correspondingly forced through the passageways with which such parts are provided and into the several mold cavities.

The operation of the press as a whole should be obvious from the foregoing description of the construction and operation of its several component elements. Thus the mold parts instead of being charged while in open position, as shown in dotted outline at the left in Fig. 1, are charged while held in their closed position between the press heads, as shown in Fig. 2. While they are being brought to such position cylinder 24 with its charging extension 28 will be drawn to the right by actuation of cylinder 23. Then after the press heads have been closed, said cylinder 24 with its extension is moved to the left with the extension properly indexed, and such cylinder and extension thereupon rotated to couple the end of the latter with the projections on the adjacent sides of the mold parts. Finally, plunger 26 in cylinder 24 is actuated to force the additional supply of stock introduced through opening 40, through the bore of such extension and the passages in the mold parts that communicate with the individual cavities in the latter. After such charging operation is completed, the cylinder 24 with its extension will be rotated so as to uncouple the latter from the projections on the mold parts and the cylinder moved to the right so as to draw said extension out of the way of the mold parts. When the vulcanization of the material in the mold parts is completed, the latter will then be withdrawn from between the press heads into their open position, the molded articles removed therefrom, and after cleaning the cavities and connecting channels such parts again returned to their closed position and the operations just described repeated.

It will be understood that instead of the several hydraulic cylinders described as being used to operate the various parts of the mold charging mechanism, other equivalent power means may be utilized. In any event, such power means, together with the electric motor or equivalent means utilized to move the mold into and out of position between the press heads may be so connected together as to operate in proper sequence once the press is set in motion, without any other attention on the part of the operator than to place the necessary charge of plastic material in the tubular extension 28. In other words, after the mold parts in their open position have been cleared of the previously molded articles and such parts prepared for the next operation, the several movements of the press required to bring such parts between the press heads, close the latter upon the mold, connect the charging mechanism with the mold, disconnect such charging mechanism, and return the mold parts back to their open position, may all be caused to follow automatically.

In referring to the plastic material, upon which my improved molding mechanism is designed to operate, as rubber, it will be understood that this term is intended to connote not only the product resulting from the vulcanization of natural rubber, but also neoprene and other synthetic rubbers or rubber substitutes which are now available.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In mechanism of the character described, the combination of a pair of opposed press-heads relatively movable towards and from each other, a mold comprising complementary parts movable into and out of position between said press-heads, said mold having a laterally opening passage communicating with the interior thereof, plastic material supply means adapted to connect with such passage when said mold is held between said press-heads, said means including a tubular member reciprocable axially of such passage and also rotatable about such axis and a coupling operative by rotation of said member to detachably connect the end of said member to said mold, means for reciprocating said tubular member, and means for rotating said tubular member.

2. In mechanism of the character described, the combination of a pair of opposed press-heads relatively movable towards and from each other, a mold comprising complementary parts movable into and out of position between said press-heads, said mold parts having mating, semi-cylindrical projections formed with recesses adapted in the closed position of said parts to provide a laterally opening passage communicating with the interior of said mold, a tubular member reciprocable axially of such passage, and also rotatable about such axis, and cooperating elements on the end of said member and said projections, respectively, adapted to engage each other in locking relation upon rotation of said member in one direction and to disengage from such locking relation upon rotation of said member in the opposite direction, means for reciprocating said tubular member, and means for rotating said tubular member.

3. In mechanism of the character described, the combination of a pair of opposed press-heads relatively movable towards and from each other, a mold comprising complementary parts movable into and out of position between said press-heads, said mold parts having mating, semi-cylindrical projections formed with recesses adapted in the closed position of said parts to provide a laterally opening passage communicating with the interior of said mold, a tubular member reciprocable axially of such passage and also rotatable about such axis, cooperating elements on the end of said member and said projections, respectively, adapted to engage each other in locking relation upon rotation of said member in one direction and to disengage from such locking relation upon rotation of said member in the opposite direction, means adapted to force plastic material under pressure through said member when thus connected, means for reciprocating said tubular member, and means for rotating said tubular member.

4. In mechanism of the character described, the combination of a pair of opposed press-heads movable towards and from each other, a mold comprising complementary parts movable into and out of position between said press-heads, said mold parts having mating, semi-cylindrical projections formed with recesses adapted in the closed position of said parts to provide a laterally opening passage communicating with the interior of said mold, a tubular member reciprocable axially of such passage and also rotatable about such axis, cooperating elements on the end of said member and said projections, respectively, adapted to lock the same together upon rotation of said member in one direction and unlock the same upon rotation thereof in the opposite direction, means adapted thus alternately to rotate said member, and means adapted to force plastic material under pressure through said member when thus connected.

5. In mechanism of the character described, the combination of a pair of opposed press-heads movable towards and from each other, a mold comprising complementary parts movable transversely of said press-heads into and out of position therebetween, said mold parts having mating, semi-cylindrical projections formed with recesses adapted in the closed position of said parts to provide a laterally opening passage communicating with the interior of said mold, a slide-way aligned with said projections when said mold is in closed position between said press-heads, a fluid-pressure cylinder reciprocable on said slide-way and also rotatable about its axis, a tubular extension on said cylinder directed toward said projections in such closed position of said mold, a piston in said cylinder, a plunger in said extension carried by said piston, and cooperating elements on the end of said extension and said projections, respectively adapted to lock the same together upon rotation of said extension in one direction and unlock the same upon rotation thereof in the opposite direction, means for reciprocating said cylinder, and means for rotating said cylinder.

6. In mechanism of the character described, the combination of a pair of opposed press-heads movable towards and from each other, a mold comprising complementary parts movable transversely of said press-heads into and out of position therebetween, said mold parts having mating, semi-cylindrical projections formed with recesses adapted in the closed position of said parts to provide a laterally opening passage communicating with the interior of said mold, means adapted automatically to close said mold parts when the latter are moved to position between said press-heads and to open said parts when moved from such position, a slide-way aligned with said projections when said mold is in closed position between said press-heads, a fluid-pressure cylinder reciprocable on said slide-way and also rotatable about its axis, a tubular extension on said cylinder directed toward said projections in such closed position of said mold, a piston in said cylinder, a plunger in said extension carried by said piston, cooperating elements on the ends of said extension and said projections, respectively adapted to lock the same together upon rotation of said extension in one direction and unlock the same upon rotation thereof in the opposite direction, means for reciprocating said cylinder, and means for rotating said cylinder.

7. Mechanism for molding plastic material such as rubber and the like, including a mold comprising two complementary parts defining a mold cavity, a channel leading from such cavity to the exterior of said mold at the separation line of said parts, a hollow reciprocable and rotatable material injecting member adapted to engage said mold in communication with the outer opening of said channel, cooperating means on said mold and member adapted to enter into locking engagement upon rotation of said member, and means operative to rotate said member after closing of said mold to lock said member thereto.

EDMUND M. WINEGAR.

REFERENCES CITED

The following references are of record in the file of this patent:

UNITED STATES PATENTS

| Number | Name | Date |
| --- | --- | --- |
| 133,229 | Hyatt et al. | Nov. 19, 1872 |
| 2,112,342 | Lester | Mar. 29, 1938 |
| 2,171,511 | Winegar et al. | Aug. 29, 1939 |
| 2,293,304 | Muller et al. | Aug. 18, 1942 |